United States Patent [19]

Matsumoto

[11] Patent Number: 5,665,661
[45] Date of Patent: *Sep. 9, 1997

[54] CRYSTALLIZATION OF GRAIN BOUNDERY PHASES IN SILICON CARBIDE CERAMICS

[75] Inventor: Roger Lee Ken Matsumoto, Newark, Del.

[73] Assignee: Lanxide Technology Company, LP, Newark, Del.

[*] Notice: The term of this patent shall not extend beyond the expiration date of Pat. No. 5,281,564.

[21] Appl. No.: 454,350

[22] PCT Filed: Dec. 28, 1993

[86] PCT No.: PCT/US93/12623

§ 371 Date: Jun. 20, 1995

§ 102(e) Date: Jun. 20, 1995

[87] PCT Pub. No.: WO94/14726

PCT Pub. Date: Jul. 7, 1994

Related U.S. Application Data

[63] Continuation of Ser. No. 998,167, Dec. 29, 1992, Pat. No. 5,281,564.

[51] Int. Cl.$^6$ ..................................................... C04B 35/577
[52] U.S. Cl. .............................. 501/92; 501/93; 501/96.3
[58] Field of Search .......................... 501/88, 89, 92, 501/96, 93

[56] References Cited

U.S. PATENT DOCUMENTS

| 5,204,294 | 4/1993 | Matsumoto | 501/92 |
| 5,281,564 | 1/1994 | Matsumoto | 501/88 |

FOREIGN PATENT DOCUMENTS 0435064  7/1991  European Pat. Off.

OTHER PUBLICATIONS

A. I. Burykina, L. V. Strashinskaya, and T. M. Evtushok, "Investigation of the Interaction of Silicon Carbide with Refractory Metals and Oxides." Fiziko–Khimicheskaya Mekhanika Materialov, vol. 4, No. 3, pp. 301–305, 1968.

*Primary Examiner*—Karl Group

[57] ABSTRACT

A silicon carbide ceramic having crystalline grain boundary phases is prepared by heating a composition comprising silicon carbide, a silicate glass and a high metal content transition metal silicide, to a temperature of 1300° C. to 2100° C. under vacuum until oxygen is removed from the glass as SiO gas, and the glass that remains within the silicon carbide ceramic crystallizes.

20 Claims, No Drawings

CRYSTALLIZATION OF GRAIN BOUNDERY PHASES IN SILICON CARBIDE CERAMICS

This patent application is a continuation of commonly owned U.S. patent application Ser. No. 07/998,167, filed Dec. 29, 1992, and now issued as U.S. Pat. No. 5,281,564.

TECHNICAL FIELD

This invention relates to a method for producing silicon carbide ceramics.

BACKGROUND ART

Glass-free silicon carbide ceramics are known for maintaining their strength at high temperatures. They are made by sintering silicon carbide powder containing boron and carbon additives at temperatures in excess of 2000° C., which, in contrast to the majority of other ceramics, results in a dense ceramic that contains no amorphous or glassy phases between the grains. Because SiC is a covalently bonded material, it is difficult to sinter by solid state diffusion processes. The addition of boron and carbon has been found to enhance the surface diffusion of the grains, which allows the material to sinter, although at very high temperatures.

Recently, attempts have been made to liquid-phase sinter SiC at lower temperatures by using oxide additives such as $Al_2O_3$ and $Y_2O_3$. The goal has been to add these oxides in a ratio that produces YAG (yttrium aluminum garnet) upon cooldown from sintering in order to obtain a totally crystalline product. A material that has been commercialized using this method is Carborundum HEXALOY-SX. However, the oxide sintering aids react with the surface of the silicon carbide to yield a silicate glass. This glass is difficult to crystallize, and a thin amorphous layer remains between the grains. Consequently, the major problem with this approach is that the excellent high temperature properties of SiC are compromised due to the presence of a glassy film that results from the addition of the oxides.

SUMMARY OF THE INVENTION

The process of this invention for crystallizing the grain boundaries of a silicate glass-containing silicon carbide composition comprises heating a composition comprising (1) from about 20% to about 99% silicon carbide, (2) from 0.5% to about 20% of a silicate glass, and (3) from 0.001% to about 80% of a high metal content silicide of a transition metal of IUPAC groups 3, 4, 5, 6, 7, 8, 9, 10 or 11, all percentages being by weight based on the total weight of the composition, to a temperature of 1300° to 2100° C. under vacuum until oxygen is removed from the silicate glass as SiO gas and the glass that remains within the silicon carbide ceramic crystallizes.

The starting material for the process of this invention can be (1) a powder mixture of silicon carbide, a silicate glass-forming sintering aid and a transition metal or transition metal compound, (2) a powder mixture of silicon carbide, a silicate glass-forming sintering aid and a high metal content silicide, or (3) a sintered ceramic comprising silicon carbide, a silicate glass and a high metal content transition metal silicide.

DETAILED DESCRIPTION OF THE INVENTION AND REFERRED EMBODIMENTS

It has been discovered that the grain boundaries of a silicate glass-containing silicon carbide composition can be crystallized by heating the composition to a temperature of 1300°–2100°C. under a vacuum in the presence of a high metal content transition metal silicide until oxygen is removed from the silicate glass as SiO gas, and the glass that remains within the silicon carbide ceramic crystallizes.

The process of this invention for eliminating the glassy grain boundary phases that result from the use of oxide additives in the liquid phase sintering of silicon carbide ceramics takes advantage of the catalytic nature of certain high metal content transition metal silicides, under certain conditions, in removing oxygen from these glassy grain boundaries, with resultant crystallization of the glass. The conditions required are processing under a vacuum and at a temperature high enough to form SiO gas as the oxidation product of the metal silicide. The catalytically active silicides suitable for the practice of this invention are high metal content silicides that oxidize in such a fashion that oxygen-silicon bonds are formed in preference to oxygen-metal bonds. High metal content silicides are defined as transition metal silicides that have a metal to silicon atomic ratio greater than or equal to one, e.g., $CoSi$, $Mo_5Si_3$, $Co_2Si$, $Fe_3Si$ and $Ni_3Si_2$. The silicides suitable for the practice of this invention are high metal content silicides of IUPAC group 3, 4, 5, 6, 7, 8, 9, 10 and 11 transition metals.

The starting material for the process of this invention can be (1) a powder mixture of silicon carbide, a high metal content silicide of a transition metal and a silicate glass-forming sintering aid, (2) a powder mixture of silicon carbide, a transition metal, or a compound thereof, and a silicate glass-forming sintering aid, or (3) a sintered ceramic comprising silicon carbide, a high metal content transition metal silicide and a silicate glass.

In the preferred embodiment of the present invention, the transition metals are reacted with silicon carbide in situ to form their corresponding high metal content silicides. Some of the IUPAC group 3, 4, 5, 6, 7, 8, 9, 10 and 11 transition metals form high temperature-stable carbides in their reaction with silicon carbide, which can diminish their effectiveness in the practice of this invention. It has been discovered, however, that for several such metals, the high metal content silicide is formed as well. The preferred transition metals are therefore molybdenum, iron, ruthenium, osmium, cobalt, rhodium, iridium, nickel, palladium, platinum, and copper. Cobalt, rhodium and iridium are most preferred.

It is preferred to form the high metal content silicides of the present invention in situ by reaction of the transition metal directly with the silicon carbide in the powder formulation. However, the silicide can also be formed by the reaction of a transition metal compound such as an oxide, chloride, nitrate or metal chelate with the silicon carbide during the heating process. Alternatively, the high metal content silicide can be added directly to the powder formulation. The addition of low metal content silicides, which are usually the commercially available silicides, e.g., $MoSi_2$ or $CoSi_2$, will not result in the desired silicide phase. Low metal content silicides are not suitable for use in this process because of their oxidation behavior.

When a transition metal, or a transition metal compound, is used in the starting powder mixture, it is present in an amount of 0.001% to about 50%, preferably 0.001% to about 25%, and most preferably 0.001% to 1%, based on the total weight of the composition. If a high metal content silicide is used, either as a component of a powder mixture or of a sintered ceramic, it is present in an amount of 0.001% to about 80%, preferably from 0.001% to about 40%, and most preferably from 0.001% to 1%, based on the total weight of the composition.

The starting silicon carbide powder can be any commercially available silicon carbide powder. The phase of the powder can be either the alpha or beta phase, or a mixture of the two. Because the sintering temperature can be below the usual beta-to-alpha transition temperature, the silicon carbide ceramic obtained by sintering the powder mixture can have the same phase as the silicon carbide powder in the starting mixture. When the process of this invention is applied to a sintered silicon carbide ceramic, the silicon carbide can be either the alpha or the beta phase, or a mixture of the two. The amount of silicon carbide used can range from about 20% to about 99%, preferably from about 60% to about 90%, and most preferably from about 95% to about 99%, based upon the total weight of the composition.

The starting powder mixture also includes from 0.5% to about 20%, preferably 1% to about 10%, based upon the total weight of the composition, of a silicate glass-forming sintering aid. The silicate glass-forming sintering aid can be added as a powder or can be formed in situ by the reaction of an oxide or nitride sintering aid with the silica that is inherently present on the surface of the silicon carbide powder. When a nitride sintering aid is used, it is sometimes desirable to add silica in addition to that which is inherently present on the surface of the silicon carbide. The amount of sintering aid used must be sufficient to densify the ceramic to the degree desired and also depends upon which silicide is used and how much is used. The amount of sintering aid required can readily be determined by one skilled in the art. The sintering aid is selected from the group consisting of oxides, nitrides and silicates of elements of IUPAC groups 2, 3, 4, 13 and the lanthanide series, and mixtures thereof. A combination of aluminum oxide and yttrium oxide is preferred.

When a presintered silicon carbide ceramic is used as the starting material, the ceramic contains from 0.5% to about 20%, preferably from 1% to about 10%, of a silicate glass containing the same elements as those mentioned in connection with the sintering aids.

If a glass-free ceramic comprising an extremely high percentage of silicon carbide is desired, e.g., 90–99 weight % SiC, catalytic amounts of silicides are used, i.e., less than 1% by weight. If microcomposites of high metal content silicide particles dispersed in a silicon carbide matrix are desired, large amounts of metal silicides can be used. By microcomposite is meant a composite wherein discrete particulate domains of the silicide are homogeneously dispersed within the silicon carbide matrix at the micron to submicron level.

The composition can additionally contain other ceramic or metal phases that do not interfere with the catalytic effect of the high metal content silicide upon the glassy grain boundary phases. Such additives can be refractory nitrides, borides or carbides other than SiC. Such additives include, for example, titanium carbide, zirconium carbide, boron carbide, tungsten carbide, silicon nitride, titanium nitride, titanium diboride and zirconium diboride.

When silicon carbide powders are used, they can be wet or dry milled with the silicate glass-forming sintering aid(s) or with the metal, metal compound, or high metal content silicide. The three components can also be milled together. Milling can be performed with any conventional equipment, such as, for example, ball mills, vibratory mills and attrition mills. Whatever mixing process is chosen, the final powder mix should comprise a well dispersed mixture of silicon carbide powder, the silicate glass-forming sintering aid and the metal, metal compound or high metal content silicide.

If wet milled, the slurry obtained in this manner can be used for slip casting or any other liquid forming process. Alternatively, the slurry can be dried, for example, by spray drying. The resulting dry powder can be formed into shapes by any powder forming technique including, for example, dry pressing (uniaxial or isostatic), tape casting, injection molding or extrusion. The powder mixture may or may not contain a binder, depending upon the forming technique selected.

Shaped articles made from the powder compositions described above can be densified by liquid phase sintering at high temperatures. Suitable sintering techniques include, for examples hot pressing, hot isostatic pressing or pressureless sintering. The part can also be sintered without full densification, depending upon its intended use. The sintering temperature chosen will thus be a function of the amount of sintering aid used and the degree of densification desired.

The processes of this invention that utilize powder mixtures as starting materials can be carried out following either a one-step or a multi-step procedure. Sintering and deoxygenation are preferably accomplished concurrently using a one-step procedure in which a shaped article containing the metal, metal compound or a high metal content silicide is heated from room temperature to the sintering temperature, typically 1600°–2100° C., entirely under a vacuum atmosphere. Alternatively, a multi-step procedure can be used in which heating cycles and atmospheres are varied sequentially as described below.

If the starting material contains a transition metal, or transition metal compound, the mixture can be first heated to a temperature of 1000°–2100° C. under an argon atmosphere until a high metal content transition metal silicide forms. The atmosphere chosen for this step of the process can be an inert, reducing, or vacuum atmosphere. An inert atmosphere is preferred. Typical inert atmospheres suitable for the practice of this invention are argon and nitrogen, while typical reducing atmospheres suitable for the practice of this invention are hydrogen- or ammonia-containing atmospheres. Heating can then be continued under a vacuum at 1300°–2100° C. During this subsequent heating step, deoxygenation and crystallization of the glassy grain boundary phase occur. Finally, the ceramic can be sintered by heating at 1600°–2100° C. under an inert, reducing, or vacuum atmosphere. An inert atmosphere is again preferred for the sintering step. Suitable inert and reducing atmospheres are defined above. Pressureless sintering or hot pressing techniques are preferred for the sintering step.

When the starting material contains a high metal content transition metal silicide instead of a transition metal, or transition metal compound, the initial step of heating to 1000°–2100°C. can be eliminated. Subsequent processing steps are identical to those described in the preceding paragraph for compositions containing a transition metal or a transition metal compound.

When a sintered, glass-containing silicon carbide ceramic containing a high metal content transition metal silicide is used as the starting material, the only processing step required is heating to a temperature of 1300°–2100° C. in a vacuum atmosphere.

The deoxygenation process described in any of the alternative procedures described above is accompanied by the evolution of silicon monoxide (SiO), which is a gas above 1300° C. at processing pressures of less than one atmosphere, i.e., a vacuum. For the purpose of this invention, vacuum is defined as any pressure in which the partial pressure of oxygen in the process gas is less than the atmospheric partial pressure of oxygen, and in which the total process gas pressure is lower than atmospheric. The extent of deoxygenation can be controlled by the temperature and time at temperature, as well as by the level of vacuum applied. The vacuum environment serves three purposes: (1) it eliminates residual oxygen activity in the process atmosphere, (2) it promotes the formation of SiO gas in the composition, rather than condensed phase $SiO_2$ (which would form under a higher oxygen partial pressure), and (3) it rapidly removes the gaseous SiO from the ceramic as it is evolved.

The extent of glass crystallization will be dependent upon the deoxygenation conditions, the degree of dispersion of the high metal content silicides in the sintered body, the time and temperature at which the ceramic is processed under vacuum, and the degree of vacuum used.

While not wishing to be bound by theory, it is believed that deoxygenation occurs when the metal silicide reacts with the glass to form free metal and gaseous SiO during application of a vacuum at a temperature above 1300°C. The free metal subsequently reacts with additional silicon carbide in the composition to reform the high metal content silicide. These reactions continue until a sufficient amount of the reactive oxygen in the glass phase is removed as SiO gas such that the glass crystallizes. The silicon carbide ceramic can thus be sintered at low temperatures and still be completely devoid of glassy phases. However, full depletion of reactive oxygen from the ceramic is possible only if no additional oxygen is available to the ceramic during processing. For example, if oxygen is present as a trace impurity in an inert processing gas, reactive oxygen will remain in the ceramic. A level of even one part per billion oxygen impurity is a substantial quantity when there is a continuous gas flow during processing.

All parts and percentages in this specification are by weight unless otherwise noted.

EXAMPLE 1

Beta-silicon carbide powder (171.9 g) was milled in a small vibratory mill along with 20.0 g cobalt metal powder, 2.7 g aluminum oxide and 5.4 g yttrium oxide. Water (133 g) was used to make a slurry and a small quantity of Darvan-C® (R. T. Vanderbilt, Norwalk, Ct.) dispersant was added to improve the mixing. The slurry was milled for 16 hours and subsequently spray dried in a small laboratory spray dryer. Approximately 50 g of the dried powder were loaded into a 2 inch diameter graphite die and hot pressed at 2000C. for one hour under an applied pressure of 4000 psi. The atmosphere surrounding the die was argon. A disc about 0.25 inch thick was formed having a bulk density, as determined by water displacement, of 3.43 g/cm³. Phase analysis by X-ray diffraction shows predominantly beta-silicon carbide with some alpha phase present, along with CoSi as the silicide phase. The disc was surface ground and sliced into test bars. The sliced surface of one of these bars was investigated by scanning electron microscopy (SEM) (Hitachi S-4000). The sliced surface was coated with about a 2 nm thick gold-palladium coating. At 10,000X magnification, the presence of a glassy film can be seen at grain junctions and on the surface of crystalline grains where the fracture was intergranular. At 100,000X magnification, the glassy nature of the intergranular film is quite apparent and occupies all of the intergranular space.

One of these test bars was reheated to 1400°C. under a vacuum of about 60 millitorr and held at that temperature for 48 hours. After removal from the furnace, the external appearance was unchanged, and the bulk density decreased only slightly to 3.37 g/cm³. A fresh fracture surface was made and examined by SEM as above. At 10,000X magnification, the fracture surface appears as before, except that there is a marked absence of any glassy intergranular phase. At 100,000X magnification, the absence of glassy intergranular material is more evident, i.e., the crystalline grains meet, with no glass in between.

I claim:

1. An article comprising a sintered silicon carbide composition having grain boundary interfaces, comprising at least one material selected from the group consisting of beta-silicon carbide and alpha-silicon carbide, and further comprising CoSi, wherein said grain boundary interfaces within said article are substantially free of any glassy intergranular phase.

2. The article of claim 1, wherein said sintered silicon carbide composition further comprises at least one additive selective from the group consisting of refractory nitrides, borides and carbides other than SiC.

3. The article of claim 2, wherein said additive comprises at least one selected from the group consisting of titanium carbide, zirconium carbide, boron carbide, tungsten carbide, silicon nitride, titanium nitride, titanium diboride, and zirconium diboride.

4. The article of claim 1, wherein said grain boundary interfaces are crystalline.

5. An article comprising a sintered silicon carbide composition having grain boundary interfaces, comprising at least one material selected from the group consisting of beta-silicon carbide and alpha-silicon carbide, and further comprising at least one high metal content silicide of a transition metal of IUPAC group 3, 4, 5, 6, 7, 8, 9, 10, or 11, wherein said grain boundary interfaces within said article are substantially free of any glassy intergranular phase.

6. The article of claim 5, wherein said transition metal is selected from molybdenum, iron, ruthenium, osmium, cobalt, rhodium, iridium, nickel, palladium, platinum, and copper.

7. The article of claim 5, wherein said transition metal is selected from cobalt, rhodium and iridium.

8. The article of claim 5, wherein said sintered silicon carbide composition further comprises at least one additive selected from the group consisting of refractory nitrides, borides and carbides other than SiC.

9. The article of claim 8, wherein said additive comprises at least one selected from the group consisting of titanium carbide, zirconium carbide, boron carbide, tungsten carbide, silicon nitride, titanium nitride, titanium diboride, and zirconium diboride.

10. The article of claim 5, wherein said grain boundary interfaces are crystalline.

11. The articles of claim 5, wherein said high metal content silicide is present as microcomposites dispersed within the sintered silicon carbide composition.

12. An article comprising a sintered silicon carbide composition comprising a mixture, said mixture comprising:
at least one material selected from the group consisting of beta-silicon carbide and alpha-silicon carbide;
a high metal content silicide of a transition metal of IUPAC Group 3, 4, 5, 6, 7, 8, 9, 10 or 11;
at least one carbide of said transition metal; and
a devitrified glass comprising a polycrystalline decomposition reaction product of a silicate glass, said decomposition resulting from the evolution of silicon monoxide gas from said silicate glass.

13. The article of claim 12, wherein said silicate glass comprises at least one element selected from the group consisting of aluminum and yttrium.

14. The article of claim 12, wherein said silicate glass comprises a silicate glass of an element selected from the group consisting of IUPAC Groups 2, 3, 4, 13, and the lanthanide series.

15. The article of claim 12, wherein the transition metal is selected from molybdenum, iron, ruthenium, osmium, cobalt, rhodium, iridium, nickel, palladium, platinum, and copper.

16. The article of claim 12, wherein said transition metal is selected from cobalt, rhodium and iridium.

17. The article of claim 12, wherein said high metal content silicide results from the reaction between a transition metal compound and alpha-silicon carbide or beta-silicon carbide during heating.

18. The article of claim 12, wherein said high metal content silicide is present as microcomposites dispersed within the sintered silicon carbide composition.

19. The article of claim 12, wherein said sintered silicon carbide composition further comprises at least one additive selected from the group consisting of refractory nitrides, borides and carbides other than SiC.

20. The article of claim 19, wherein said additive comprises at least one selected from the group consisting of titanium carbide, zirconium carbide, boron carbide, tungsten carbide, silicon nitride, titanium nitride, titanium diboride, and zirconium diboride.

* * * * *